(12) United States Patent
Stenberg

(10) Patent No.: US 11,022,244 B2
(45) Date of Patent: Jun. 1, 2021

(54) LOCKABLE FRICTION JOINT FOR ADJUSTMENT OF RELATIVE PIVOTAL POSITIONING OF PIPE SECTIONS

(71) Applicant: FUMEX AB, Skellefteå (SE)

(72) Inventor: Gustav Stenberg, Skellefteå (SE)

(73) Assignee: FUMEX AB, Skellefteå (SE)

( * ) Notice: Subject to any disclaimer, the term of this patent is extended or adjusted under 35 U.S.C. 154(b) by 358 days.

(21) Appl. No.: 16/078,598

(22) PCT Filed: Feb. 8, 2017

(86) PCT No.: PCT/SE2017/050122
§ 371 (c)(1),
(2) Date: Aug. 21, 2018

(87) PCT Pub. No.: WO2017/146630
PCT Pub. Date: Aug. 31, 2017

(65) Prior Publication Data
US 2019/0049045 A1 Feb. 14, 2019

(30) Foreign Application Priority Data
Feb. 23, 2016 (SE) .................................. 1650232-0

(51) Int. Cl.
*F16L 27/08* (2006.01)
*F16L 27/111* (2006.01)
(Continued)

(52) U.S. Cl.
CPC ......... *F16L 27/0849* (2013.01); *F16L 27/111* (2013.01); *F16L 43/02* (2013.01); *B08B 15/002* (2013.01)

(58) Field of Classification Search
CPC ...... F16L 27/0849; F16L 27/111; F16L 43/02; F16L 27/00; F16L 27/08; F16L 27/0861;
(Continued)

(56) References Cited

U.S. PATENT DOCUMENTS 3,904,298 A 9/1975 Lindgren
4,540,202 A * 9/1985 Amphoux ........... F16L 27/0857
285/184
(Continued)

FOREIGN PATENT DOCUMENTS

CN 101282794 A 10/2008
CN 107407367 A 11/2017
(Continued)

OTHER PUBLICATIONS

Extended European Search Report received for European Patent Application No. 17756920.9, dated Sep. 17, 2019, 8 pages.
(Continued)

*Primary Examiner* — Matthew Troutman
*Assistant Examiner* — William S. Choi
(74) *Attorney, Agent, or Firm* — Morrison and Foerster LLP

(57) ABSTRACT

A lockable friction joint includes a first joint member with a first arm member and a second joint member with a second arm member, the first and second joint members each having an inner friction surface and pivotal connecting projections. A friction adjustment device includes an adjustment element on an outer surface of the second joint member, and a fixating element on an outer surface of the first joint member. A plurality of friction discs are adjacent each other and between the inner friction surfaces of the first and second joint members, whereby friction between the friction discs is adjusted by the adjustment element. Each friction disc has at least one friction surface acting on an adjacent friction surface of another element of the friction joint and each friction disc is pivotally coupled to at least one other element of the friction joint.

6 Claims, 3 Drawing Sheets

(51) Int. Cl.
*F16L 43/02* (2006.01)
*B08B 15/00* (2006.01)

(58) Field of Classification Search
CPC ............... F16L 27/0857; F16L 27/0845; F16L 27/0841; F16L 27/0837; B08B 15/002; F21V 21/30
USPC .................................... 285/184, 185; 454/65
See application file for complete search history.

(56) References Cited

U.S. PATENT DOCUMENTS

| | | | | |
|---|---|---|---|---|
| 4,860,644 | A | * | 8/1989 | Kohl ..................... B08B 15/002 285/184 |
| 5,146,808 | A | | 9/1992 | Hoshino |
| 5,211,602 | A | | 5/1993 | Holmgren |
| 5,536,206 | A | | 7/1996 | Bodmer et al. |
| 8,460,140 | B2 | | 6/2013 | Joslyn et al. |
| 2004/0082293 | A1 | | 4/2004 | Sharifi et al. |
| 2005/0161945 | A1 | * | 7/2005 | Cheng ................. F16L 27/0857 285/184 |
| 2011/0149582 | A1 | | 6/2011 | McKee |

FOREIGN PATENT DOCUMENTS

| | | |
|---|---|---|
| SE | 358753 B | 8/1973 |
| SE | 519926 C2 | 4/2003 |
| SE | 529141 C2 | 5/2007 |
| WO | 2002/074459 A1 | 9/2002 |
| WO | 2007/015663 A1 | 2/2007 |

OTHER PUBLICATIONS

International Preliminary Report on Patentability received for PCT Patent Application No. PCT/SE2017/050122, dated Sep. 7, 2018, 7 pages.
International Search Report and Written Opinion received for PCT Patent Application No. PCT/SE2017/050122, dated Apr. 11, 2017, 10 pages.

* cited by examiner

LOCKABLE FRICTION JOINT FOR ADJUSTMENT OF RELATIVE PIVOTAL POSITIONING OF PIPE SECTIONS

This application is the National Stage of International Application No. PCT/SE2017/050122, filed Feb. 8, 2017, which claims the benefit of Sweden Patent Application No. SE 1650232-0, filed Feb. 23, 2016, the disclosures of which are incorporated herein by reference in their entirety.

TECHNICAL FIELD

The present invention relates to a lockable friction joint, in particular configured for adjustments of a desired pivoted position between two pipe or tube sections of for example a gas evacuation system or a localized ventilation system.

TECHNICAL BACKGROUND

In industrial or laboratory environments an appropriate air exchange and/or ventilation is of utmost importance for environmental and processing reasons. Processes which generates fumes or gases which may cause health issues or interfere with the process at hand must in such environments be handled with proper care to ensure that said fumes or gases are disposed of in an efficient manner. In some processes, such as welding, curing of particular resins, handling of chemical reactions or similar there can be a special need to efficiently dispose of said gasses or fumes at a specific local area. In such cases an adjustable localized ventilation system is often used. Such a device can be adjusted in such a way that the gas extraction unit of the device can be placed at a specific desired position and thus be close to where the gases or fumes is or will be generated. Preferably such a device should be easy to lock in place but also be easy to unlock so that the device can be re-adjusted to another position and then yet again be locked into its new position. These adjustments must also be reliable over time to ensure a safe and healthy work environment.

SE 529 141 C2 discloses such an adjustable localized ventilation system. The system comprises a plurality of pipe sections coupled with flexible tube sections in between said pipe sections, providing a piping system which can be adjusted by means of the flexible tube sections to place a gas extraction unit of the system at a desired position. The gas extraction can be moved between different positions, and also be locked in place when in a desired position. To achieve this, the system is provided with lockable friction joints at the sides of the flexible tubes, wherein an adjustment knob of an adjustment device can be turned to tighten or loosen a locking system comprising friction discs and rings, to increase or decrease the friction between said discs and rings. When the friction is lowered between the adjacent friction surfaces of the device, the pipe sections may be pivoted in relation to each other. And in contrary, when the friction is increased to a high enough level by means of the adjustment knob, the friction joint is locked in place so that the pipe sections remain rigid in relation to each other and the gas extraction unit is locked in the desired position.

There are however drawbacks with the device of SE 529 141 C2. The shape of the friction discs and rings and the way these components are designed to fit together can cause wear issues during the life span of the joint. The friction disc situated in the middle of the assembly is held in place by the two adjacent discs by means of a circumferential protruding edge on each outer disc, extending inwards towards the other discs. This can cause issues if the middle friction disc is worn out, as the edges then will hinder the friction surfaces to interact properly with each other. Furthermore, as the screw holding the adjustment device together is pivotally fixedly connected to the joint arm opposite to the adjustment knob, applied forces to the joint arm supporting the screw may affect the interlocking friction forces as the locking mechanic provided by the applied torque may be affected. Even further, as the elements for pivoting the respective friction disc of each joint arm also function as projections for limiting a potential overturning of the joint, the pivoting of the friction discs due to pivoting of the joint arms may be affected if a user exerts too much force on these elements due to trying to pivot the arms more than intended.

There is thus a need for an improved lockable friction joint for interlocking pipe sections in regards to each other, for such devices as adjustable localized ventilation systems, which eliminates the above mentioned drawbacks with prior art.

SUMMARY OF INVENTION

The object of the present invention is to provide a lockable friction joint for pipe systems which overcomes the drawbacks of prior art. More specifically the object of the invention is to provide a friction joint for reliable adjustments and locking of relative pivotal positioning of pipe sections of a pipe system on which the friction joint is mounted.

This object is achieved by the features of the characterising portion of claim 1. Further advantages of the invention are described with reference to the dependent claims.

According to a first aspect of the invention, discloses a lockable friction joint, in particular for adjustments of relative pivotal positioning of pipe sections of a pipe system on which the friction joint is mounted. The friction joint comprises a first joint member with a first arm member and a second joint member with a second arm member, the first and second joint members each having an inner friction surface and pivotal connecting projections respectively. The friction joint further comprises a friction adjustment device comprising an adjustment element situated on an outer surface of the second joint member, and a fixating element for fixating the position of the adjustment device relative to the friction joint, situated on an outer surface of the first joint member. Even further the friction joint comprises a plurality of friction discs being situated adjacent each other and between the inner friction surfaces of the joint members, wherein the friction between the friction discs can be adjusted by means of the adjustment element. The lockable friction joint is characterised in that each friction disc have at least one friction surface acting on an adjacent friction surface of another element of the friction joint and that each friction disc is pivotally coupled to at least one other element of the friction joint.

This has the advantage that a flexible and easy to use friction joint is provided for a piping system where adjustment of the positions of the pipe sections of the pipe system is needed. The friction acting between the friction surfaces of the friction discs can then be adjusted by means of the adjusting element to change the status of the interlocking friction forces in the friction joint. This has the effect that the relative pivoting of the pipe sections of the pipe system can be changed between easily moved, moved but with resistance or rigidly locked by means of increasing or decreasing the friction forces with the adjustment element. This friction discs having friction surfaces acting on adjacent elements and being pivotally coupled to at least one other element of the friction joint has the advantage that less force needs to be applied to increase the frictional forces between the friction surfaces of the discs, as all friction discs of the friction joint are actively acting in both establishing frictional contact when needed but also being pivotally held in place in regards to the respective ingoing elements of the friction joint. It is further also an advantage in that the discs are securely held in place in a simple way when then the friction forces in the friction joint are lowered. This is advantageous as it provides a stable and reliable device where high frictional forces are easily applied to the friction discs by a user, and where there is less risk of parts moving or being un-aligned in respect each other when the friction forces are lowered which can be lead to potential malfunction and/or failure of the friction joint.

According to another aspect of the invention the outer surface of the first joint member further comprises an outer friction surface and the fixating element further comprises a friction surface facing towards the outer friction surface of the first joint member.

This has the advantage that fixating element can be used for multiple functions in the friction joint, which is beneficial as it can lower the manufacturing costs due to less pieces being used, and at the same time in a simple way provide increased frictional contact surfaces in the friction joint.

According to yet another aspect of the invention the fixating element is pivotally coupled to the pivotal connecting projections of the second joint member.

This has the advantage that the adjustment element of the adjustment device cannot be pivoted if the first arm member is being pivoted and/or exerted a force upon. This is beneficial as the frictional forces remain constant when arm members are being pivoted in relation to each other during an adjustment procedure, which provides a reliable and safe to use friction joint.

According to a further aspect of the invention the fixating element further comprises a circumferential projection, and the outer surface of the first joint member further comprises an outer projection, wherein the circumferential projection and the outer projection are configured to interact and thereby limit the pivotal movement of the joint members relative to each other.

This has the advantage that the pivotal movement of the friction joint arms in relation to each other are limited in a simple and efficient way. This configuration is also beneficial in that the pivotal limitation is easily seen by a user adjusting the pipe system and therefore lessens the risk of overturning the joint which potentially could cause mechanical failure in the device. Another advantage is that the limiting mechanic of the device does not interfere with the more delicate interior parts of the friction joint which also can be a source of mechanical failure for the joint. Even further this has the advantage that the pivotal movement of the pipe sections of a pipe system is guided to be distributed over the separate sections and bends of the system. This is due to the fact that two adjacent pipe sections cannot be pivoted to be parallel to each other. Hence, if a user performing a pivoting movement of the system passes the limit of movement for one joint, the additional movement needed will automatically be translated to other parts of the system providing an easy to use system with smooth pivotal movements.

According to another aspect of the invention each friction disc has a through hole in the middle of the disc, configured to allow passage of movable elements through said hole.

This has the advantage that the friction discs provide frictional surfaces while at the same time allow for moving parts of the friction joint and/or fluids to pass through said holes if desired which is beneficial as the friction joint provided is customizable in a wide variety of ways.

According to yet another aspect of the invention the pivotal connecting projections of the first joint member are arranged in a ring formation outside of a diameter of the intermediate friction discs and protruding towards the second joint member, and the pivotal connecting projections of the second joint member are arranged in a ring formation inside of a diameter of the through hole of the intermediate friction discs and protruding towards the first joint member.

This has the advantage that the pivotal connecting projections of the respective joint member provide an evenly distributed pivotally support for interacting elements of the friction joint wherein the pivotal connecting projections of the respective joint members cannot collide with each other as they are separated by the friction discs.

According to a further aspect of the invention every other friction disc has radially spaced outer locking projections configured to interlock with the pivotal connecting projections of the first joint member, and every other friction disc has radially spaced inner locking projections configured to interlock with the pivotal connecting projections of the second joint member.

This has the advantage that each friction disc is pivotally held in place in regards to the first or the second joint member which provides a stable and reliable friction joint with less parts which are able to move freely when the frictional forces are lowered. This further has the advantage that the frictional forces are evenly spread out on the active frictional surfaces when applied by the adjustment element, while ensuring that each friction disc provides frictional force counteracting unwanted pivoting of the joint members without any of the discs acting as a sliding plane towards an adjacent element of the friction joint.

According to an even further aspect of the invention the number of intermediate friction discs is at least three.

This has the advantage that the total area of the combined frictional surfaces is increased in a simple way. This further has the advantage that the material selection for the discs allows for more freedom as the middle disc can be selected for optimal frictional performance without the need to care for direct surface interaction with the joint members of the friction joint.

According to another aspect of the invention the friction joint is mounted on the exterior of the pipe sections of the pipe system on which it is mounted.

This has the advantage that the friction joint may be applied to a wide variety of pipe systems or the like, and can be customized without the need to re-design or alter a pre-existing pipe system upon which it is being mounted. This further has the advantage that a single friction joint can be mounted on one side respective pipe section of a pipe system or if needed, two opposite friction joints can be mounted on opposite sides of said pipe sections if more frictional resistance is needed.

According to yet another aspect of the invention the friction joint is integrated in a piping system, wherein the arm members are pipes of the pipe system.

This has the advantage that an integrated friction lockable pipe system is provided which can be beneficial where space is limited. This is also advantageous for smaller pipe systems where less weight needs to be prevented from moving by the frictional forces in the friction joint.

BRIEF DESCRIPTION OF THE FIGURES

The present invention will now be described in detail with reference to the figures, wherein.

DETAILED DESCRIPTIONS OF THE INVENTION

Figure 1:
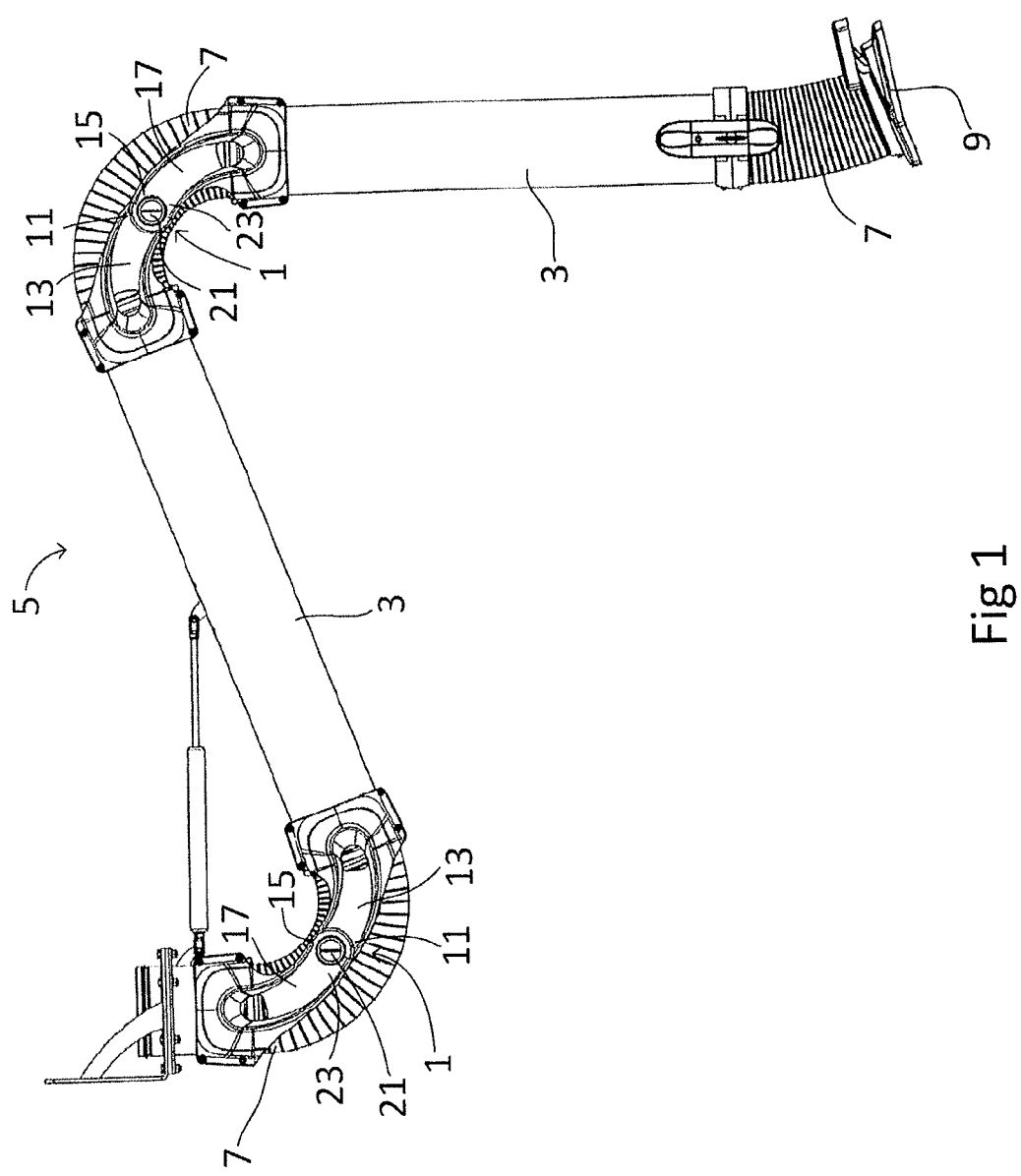
FIG. 1 shows a side view of an example of an adjustable localized gas extraction device with a lockable friction joint mounted thereupon.

Hereinafter different embodiments of the invention will be described associated with the enclosed drawings. Reference numbers are not to be viewed as restrictive in relation to the scope of the protection given by the patent claims, only as assistance in understanding the drawings and the various technical features of the invention.

As will be realized the invention can be modified in various ways without deviating from the scope of the claims, and specific features and aspects illustrated in the drawings of the different examples and embodiments may be used individually, or be combined, to achieve a variety of combined technical features and embodiments of the invention. Hence, the drawings and the description thereto should be viewed as illustrative and not restrictive.

FIG. 1 shows a side view of an adjustable localized gas extraction device upon which a lockable friction joint 1 according to the present invention is mounted. The lockable friction 1 joint is mounted on the localized gas extraction device to allow adjustments of relative pivotal positioning of pipe sections 3 of a pipe system 5 on which the friction joint 1 is mounted, the pipe system 5 being the pipes used for guiding the flow of air, gases or fumes being extracted with the localized gas extraction device. The pipe system comprises rigid pipe sections 3 coupled to each other by means of flexible tube sections 7 which allows for pivotal movement of the pipe sections 3 in regards to each other. This in turn allows for spatial positioning of a funnel or the like of the gas extraction device so that intake port 9 of the extraction device can be placed as close as possible to where the air, gases or fumes are to be evacuated. To be able to adjust said positioning, and also lock it in place when the desired positioning is achieved, the pipe systems 5 of such devices need to be provided with means to switch between a locked state and a movable state of the pipe sections 3 by a user positioning the extraction unit where it is desired. The example depicted in FIG. 1 show a friction joint 1 according to the present invention mounted on the outside of the end sections of the pipe sections 3 and extending parallel to the flexible tube sections 7 bridging the separate pipe section 3.

The friction joint 1 comprises a first joint member 11 with a first arm member 13 and a second joint member 15 with a second arm member 17, wherein the arm members 13, 17 are connected to each other by the joint members 11, 15. Said arm members 13, 17 are able to pivot about a common axis 19 going through the first and second joint members 11, 15. Each first and second joint member 11, 15 further comprise an inner friction surface and pivotal connecting projections respectively (not shown in FIG. 1).

The friction joint 1 further comprise a friction adjustment device comprising an adjustment element 21 situated on an outer surface 23 of the second joint member 15, and a fixating element (not shown in FIG. 1) for fixating the position of the adjustment device relative to the friction joint 1, situated on an outer surface 25 of the first joint member 11. The adjustment element 21 in this example is a rotatable knob which provides a user with means for adjusting the frictional forces in the friction joint 1 by turning said knob. The adjustment element 21 may be another type of adjustment element known in the art such as a lever or the like. The adjustment element 21 is connected to the fixating element situated on the opposite side of the friction joint 1 by means of, for example, a threaded pin or screw 22 (seen in FIG. 2 and FIG. 3). This allows a user to turn the adjustment element 21 to adjust the pressure exerted on the friction joint 1 by the fixating element. The more the fixating element and the adjustment element 21 are brought together by means of the threaded pin or screw, the more the intermediate elements of the friction joint 1 are compressed. Thus, if a high enough torque is applied to the adjustment element 21, the frictional forces acting between the intermediate elements of the friction joint 1, as a result of the compression, locks the joint in place preventing pivotal movement of the pipe sections 3 corresponding to said joint.

Figure 2:
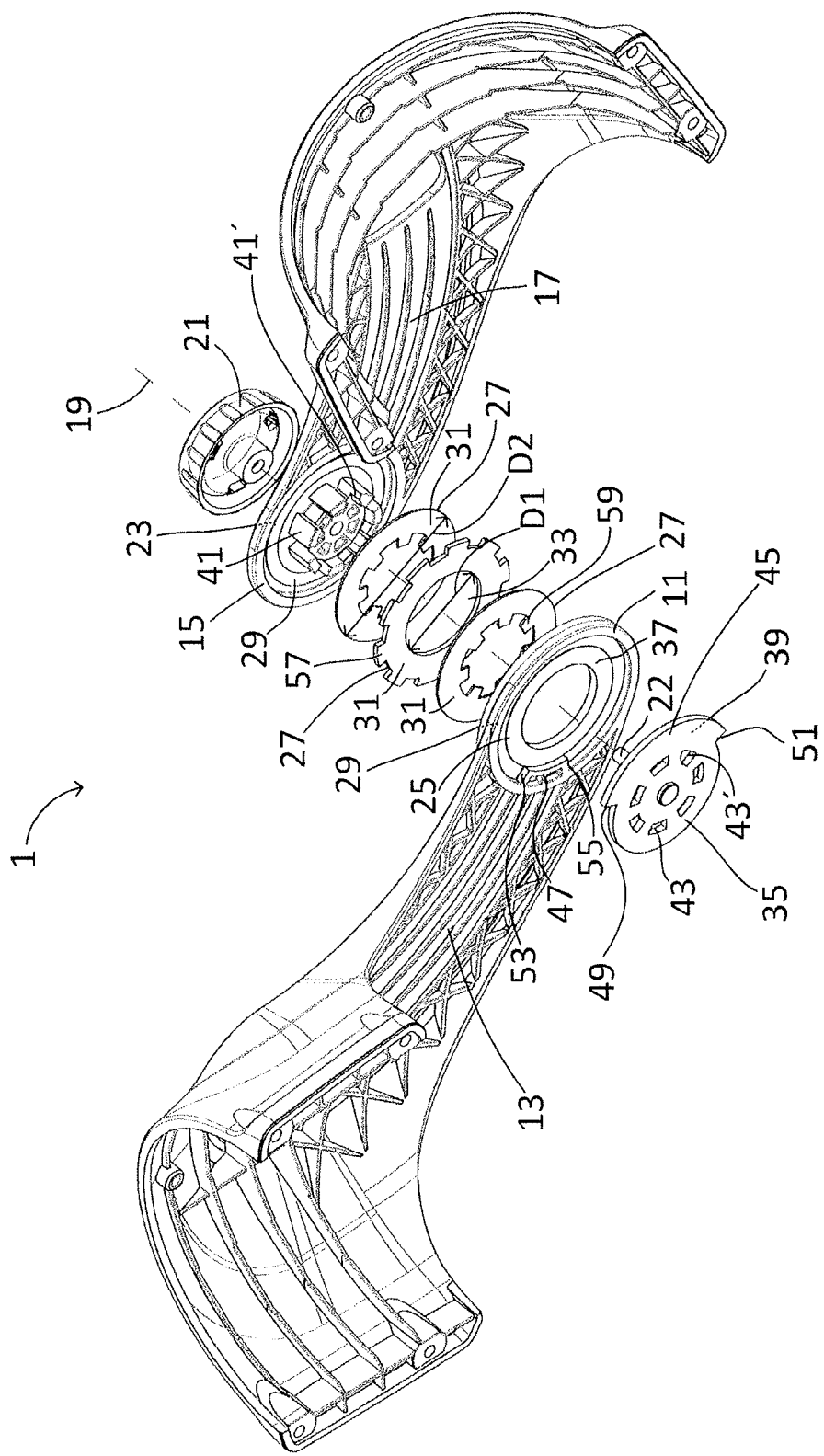
FIG. 2 shows an exploded view of an adjustable friction joint according to the present invention.
Figure 3:
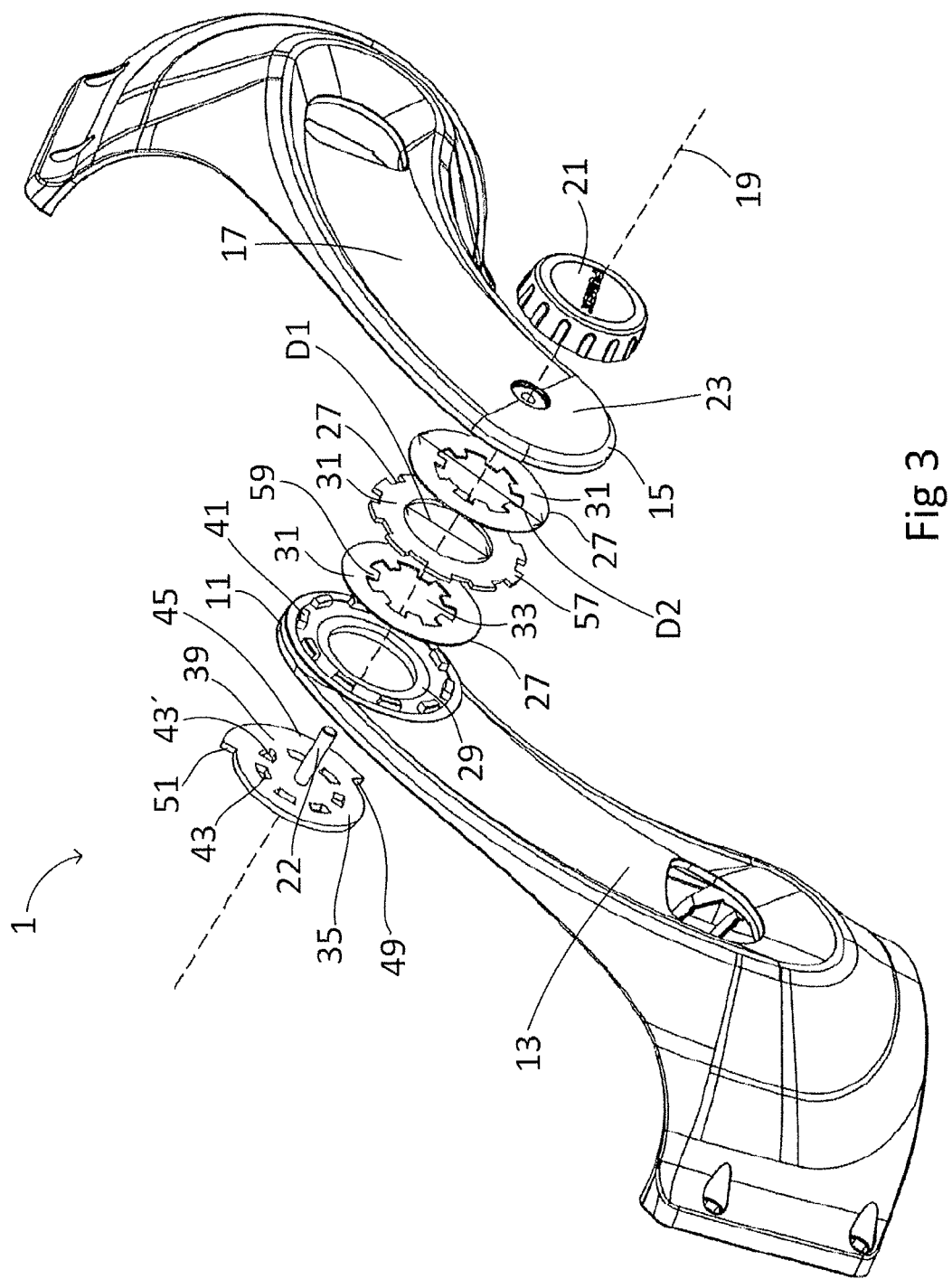
FIG. 3 shows another exploded view of an adjustable friction joint according to the present invention.

The friction joint 1 according to the present invention further comprises a plurality of friction discs 27 being situated adjacent each other and between inner friction surfaces 29 of the joint members, for a detailed view of said friction discs 27 and inner friction surfaces 29, see FIG. 2 and FIG. 3. The frictions discs are provided between the joint members 11, 15 of the friction joint 1. When the adjustment element 21 is used to increase or decrease the applied compressing force between the each element of a joint 1, said friction discs 27 are thus being pressed against each other due to said compression. Hence, the friction between the friction discs 27 can be adjusted by means of the adjustment element 21.

When no or a small amount of frictional force is applied to the friction discs of the joint 1, the arm members 13, 17 of the friction joint 1 are able to be pivoted relative to each other, either freely or with a resistance corresponding to the amount of force applied. As the weight of the pipe sections 3 and/or the pipe system 5 in its entirety may vary depending on the assembly at hand, the amount of frictional force needed to support the weight of the pipe sections 3 or system 5 vary accordingly. When the amount of frictional force reaches a limit where the frictional forces overcome the forces of gravity acting on the system 5, the friction joint 1 and thereby the pipe system 5 is locked in place. The pipe system 5 may also be provided with dampers or and/or other guiding elements which may affect the movement of the pipes sections 3. Hence, forces acting on the pipe system 5 due to hydraulic dampers and the like can also be counteracted by means of the friction joint 1 according to the present invention.

According to the invention, each friction disc 27 of the friction joint 1 comprises at least one friction surface 31 acting on an adjacent surface of another adjacent element of the friction joint 1. Said another element may be another friction disc 27 or one of the first or second joint members 11, 15 of the friction joint 1. Further, each friction disc 27 is pivotally coupled to at least one other element of the friction joint 1. This ensures the each disc 27 is actively counteracting a rotational movement in the joint 1 caused by the weight of the pipe section 3 and system 5. Each disc 27 counteract said rotational movement by means of frictional forces acting on adjacent surfaces and by means of means of being pivotally coupled to at least one other element of the joint 1. As none of the discs 27 is counteracting a rotational movement solely by means of frictional force, no disc 27 is being subjected to rotational frictional force in more than rotational direction at a time without being rotationally held in place in regards to at least one other element taking part in the rotation. Hence, no friction disc 27 in the friction joint 1 is subjected to torque directed clockwise on one side while being subjected to a torque directed counter-clockwise on the other side. Such a disc 27 needs to have a higher amount of compressing force applied to avoid pivoting of the arm members 13, 17. By having a plurality of friction discs 27 share the frictional forces due to compression, where each disc 27 also is pivotally coupled to another element wherein one of said other element is one of the first and second joint members 11, 15, less compressing force needs to be applied to the assembly by means of the adjustment element 21 to lock the friction joint 1 in place. If a friction disc 27 is being subjected to opposite torsional forces on opposite sides, the disc will also be subjected to higher sheer and torque which may deform the disc and affect the mechanical properties of said disc. If said acting forces are high enough the disc may be mechanically deformed lowering the thickness of the disc which in turn would lower the compressing forces holding the discs together. Such a situation is thereby eliminated with a friction joint 1 according to the present invention.

FIG. 2 shows an exploded view of an adjustable friction joint 1 according to an exemplary embodiment of the present invention. The friction joint 1 in this embodiment comprises a first joint member 11 having a first arm member 13 and a second joint member 15 having a second arm member 17. This example of the disclosed invention further comprises three intermediate friction discs 27 situated between the first and second joint members 11, 15. In this example all three intermediate friction discs 27 comprises a through hole 33 in the middle of each disc 27, which holes 33 are configured to allow passage of movable elements through said holes 33. The friction discs 27 may be made of metal, a polymeric material, a ceramic material or a composite material. The friction of the friction surfaces 31 of the discs 27 may stem from the material properties of the ingoing materials, or be due to surface treatment of said surfaces 31. Even further the friction joint 1 comprises a friction adjustment device comprising an adjustment element 21 and a fixating element 35.

The adjustment element 21 and the fixating element 35 are coupled to each other through the friction joint 1 by means of a threaded pin or screw 22 extending through a common axis 19 of rotation for the pivotal movement of the respective arm members 13, 17 of the friction joint 1. The first and second joint members 11, 15 and the intermediate friction discs 27 situated between said joint members 11, 15 may thereby be compressed by means of rotation of the adjustment element 21, which rotation pushes the adjustment element 21 and the fixating element 35 towards each other.

As exemplified in FIG. 2, the outer surface 25 of the first joint member 11 may further comprise an outer friction surface 37 and the fixating element 35 may further comprise a friction surface 39 facing towards the outer friction surface 37 of the first joint member 11. This increases the total amount of active frictional surfaces in the friction joint 1 without needing to provide additional intermediate friction discs 27 in the friction joint 1. As the amount of friction surfaces and thereby the total frictional surface area is increased, less force needs to be applied by a user by means of the friction adjustment device to ensure that the friction joint 1 is locked in terms of pivotal movement.

In the example of FIG. 2 the inner friction surface 29 and pivotal connecting projections 41 of the second joint member 17 are seen. The inner friction surface 29 provides frictional resistance towards a rotational movement of the adjacent friction disc 27 when the friction joint 1 is assembled. As is further seen in FIG. 2, the pivotal connecting projections 41 of the second joint member 15 are arranged in a ring formation inside of a diameter D1 of the through hole 33 of the intermediate friction discs 27 and protruding towards the first joint member 11.

The pivotal connecting projections 41 of the friction joint extend through the through hole 33 of the intermediate friction discs 27 and through a hole in the first joint member and are then coupled to the fixating element 35 by means of recesses 43 configured for engaging said connecting projections 41. The fixating element 35 is hence pivotally coupled to the pivotal connecting projections 41 of the second joint member 15. This means the fixating element 35 will be rotationally locked in regards to the second joint member 15. As the fixating element 35 is rotationally locked relative the second joint member 15, any pivotal forces from the first arm member 13 generating rotational forces of the first joint member 11, acting on the adjacent fixating element 25, will not cause a rotational displacement of the fixating element 25 in relation to the second joint member 15. This in turn means that the adjustment element 21, arranged adjacent the second joint member 15, will never be affected by a pivotal movement of the respective arm members 13, 17. This ensures that any pivotal adjustments of the arm members 13, 17 in relation to each other while the friction joint 1 is not locked will not directly affect the frictional forces of the friction discs 27 by means of involuntary rotation of the adjustment element 21.

The fixating element 35 may further comprise a circumferential projection 45, and the outer surface 25 of the first joint 11 member may comprise an outer projection 47, wherein the circumferential projection 45 and the outer projection 47 are configured to interact and thereby limit the pivotal movement of the joint members 11, 15 relative to each other. The circumferential projection 45 of the fixating element 35 further comprises a first end 49 and a second end 51. The outer projection 47 of the first joint member 11 correspondingly further comprises a first edge 53 and a second edge 55. When the first and second arm members 13, 17 of the friction joint 1 are being pivoted relative each other the outer projection 47 of the first joint member 11 will then rotate about the axis of said pivotal movement. When the rotation of the outer projection 47 in a clockwise direction reaches a predetermined limit, the first end 49 of the circumferential projection 45 abuts against the first edge 53 of the outer projection 47 which prevents further movement is said direction. Correspondingly when rotation of the outer projection 47 in a counter-clockwise direction reaches a predetermined limit the second end 51 of the circumferential projection 51 abuts against the second edge 55 of the outer projection 47 which prevents further movement is that rotational direction. This provides a simple and efficient mechanic to limit the pivotal movement of the friction joint 1 which can act as a safeguard for the flexible tube sections of a pipe system 5 on which the friction joint 1 is mounted. The interaction of the circumferential projection 45 and the outer projection 47 also acts as guiding means for the pivotal movement of the system as a whole, as movement of one friction joint 1 translates to another friction joint in the system if said circumferential projection 45 and the outer projection 47 abuts against each other and limits the pivoting of the first friction joint 1.

The pivotal connecting projections 41 of the second joint 15 member and the recesses 43 of the fixating element 35 may further be configured to prevent a misalignment of these two elements 15, 35 in regards to each other. One specific projection 41' and a corresponding recess 43' may have a modified shape so that the fixating element 35 only can be mounted in one specific angle. This provides a reliable friction joint 1 for which an incorrect assembly is impossible.

Looking at FIG. 3, the same exemplary embodiment exploded view of an adjustable friction joint 1 of the present invention is shown but from another point of view. From this angle the placement of the pivotal connecting projections 41 of the first joint member 11 are seen. Said pivotal connecting projections 41 of the first joint 11 member are arranged in a ring formation outside of a diameter D2 of the intermediate friction discs 27 and protruding towards the second joint member 15.

Looking at both FIGS. 2 and 3 it is seen that every other friction disc 27 has radially spaced outer locking projections 57 configured to interlock with the pivotal connecting projections 41 of the first joint member 11, and every other friction disc 27 has radially spaced inner locking projections 59 configured to interlock with the pivotal connecting projections 41 of the second joint member 15. Further, as is previously disclosed, the pivotal connecting projections 41 of the first joint member 11 are arranged in a ring formation outside of a diameter D2 of the intermediate friction discs 27 and protruding towards the second joint member 13, and the pivotal connecting projections 41 of the second joint member 13 are arranged in a ring formation inside of a diameter D1 of the through hole 33 of the intermediate friction discs 27 and protruding towards the first joint member 11. This provides an arrangement where every other intermediate friction disc 27 disposed between the first and second joint members 11, 15 are rotationally locked relatively the first or the second joint members 11, 15. When force is applied by compressing the assembly of friction discs 27 and joint members 11, 15 by means of the adjustment element 21 and a pivoting force is exerted on the joint arms 13, 17, each friction disc 27 will then effectively counteract pivoting of the arms 13, 17. Due to the plurality of the friction discs 27 giving rise to a high combined frictional surface area and their alternating rotational directions and being rotationally locked to alternating joint members, high forces counteracting pivoting movement of the joint are obtained by means of the adjustment element 21 and the friction discs 27.

The configuration of the friction discs 27 according to the invention further allows for providing more discs to further increase the combined frictional surface area while still maintaining the stability of the friction joint 1. To allow for a larger number of friction discs 27, the pivotal connecting projections 41 of the joint members 11, 13 can be made longer. The friction discs 27 may also individually be made thinner so that the thickness of the stack of discs remains the same. In such a case no other alterations to the friction joint 1 needs to be done. As both the first and the second joint members 11, 15 are provided with inner friction surfaces 29 the number of discs 27 is interchangeable without modifying the joint members 11, 15. The number of, and individual placement of the ingoing friction discs 27 are hence easily customizable as the design of the friction joint 1 according to the present invention remains functional in regards of abutting friction surfaces 29, 31 and pivotal connecting elements 41 interlocking with corresponding discs 27 regardless of the total number of friction discs 27.

According to the exemplary embodiment described accompanying FIGS. 2 and 3, the friction joint is configured to be mounted on the exterior of the pipe sections 3 of the pipe system 5 on which it is mounted. Depending on the size and weight of the pipe system 5 one single friction joint may be used at each bend in the pipe system 5, or two opposite friction joints 1 can be mounted on opposite sides at each bend. A pipe system 5 of larger size and weight might need the support of two friction joints 1 at each bend while a smaller pipe system 5 might be held up with just one friction joint 1.

According to another embodiment of the friction joint 1 the joint members 11, 15 may be in the shape of truncated cones and be coupled to arm members 13, 17 formed as pipe sections 3. This allows for a pipe system 5, where the friction joint 1 is integrated in the pipe system 5, wherein the arm members are pipes of the pipe system 5. In this alternate embodiment the flow of air, fumes or gas flows through the through hole 33 of the friction discs 27.

As should be obvious for a person skilled in the art, the different examples of the friction joint and its individual parts described herein can be combined in various ways without deviating from the inventive concept or the scope of the protection set up by the enclosed patent claims.

The invention claimed is:

1. A lockable friction joint for adjustments of relative pivotal positioning of pipe sections of a pipe system on which the friction joint is mounted, the friction joint comprising:
   a first joint member with a first arm member;
   a second joint member with a second arm member, wherein the first and second joint members each have an inner friction surface and pivotal connecting projections;
   a friction adjustment device comprising an adjustment element situated on an outer surface of the second joint member;
   a fixating element for fixating the position of the adjustment device relative to the friction joint and situated on an outer surface of the first joint member; and
   a plurality of friction discs situated adjacent each other and between the inner friction surfaces of the first and second joint members, wherein friction between the plurality of friction discs can be adjusted by the adjustment element, further wherein:
      each friction disc of the plurality of friction discs has at least one friction surface acting on an adjacent friction surface of another element of the friction joint and each friction disc is pivotally coupled to at least one other element of the friction joint, wherein said another element is another friction disc or one of the first or second joint members of the friction joint,
      every other friction disc of the plurality of friction discs has radially spaced outer locking projections configured to interlock with the pivotal connecting projections of the first joint member, and
      every friction disc of the plurality of friction discs without the radially spaced outer locking projections has radially spaced inner locking projections configured to interlock with the pivotal connecting projections of the second joint member, wherein the outer surface of the first joint member further comprises an outer friction surface and the fixating element further comprises a friction surface facing towards the outer friction surface of the first joint member, wherein the fixating element is pivotally coupled to the pivotal connecting projections of the second joint member, and wherein the fixating element further comprises a circumferential projection, and the outer surface of the first joint member further comprises an outer projection, wherein the circumferential projection and the outer projection are configured to interact and thereby permitting limited pivotal movement of the joint members relative to each other.

2. The lockable friction joint according to claim 1, wherein each friction disc has a through hole in the middle of the disc, configured to allow passage of movable elements through said hole.

3. The lockable friction joint according to claim 2, wherein the pivotal connecting projections of the first joint member are arranged in a ring formation outside of a diameter of the plurality of friction discs and protruding towards the second joint member, and the pivotal connecting projections of the second joint member are arranged in a ring formation inside of a diameter (D1) of the through hole of the plurality of friction discs and protruding towards the first joint member.

4. The lockable friction joint according to claim 1, wherein the number of the plurality of friction discs is at least three.

5. The lockable friction joint according to claim 1, wherein the friction joint is mounted on the exterior of the pipe sections of the pipe system on which it is mounted.

6. The lockable friction joint according to claim 1, wherein the friction joint is integrated in a piping system, wherein the arm members are pipes of the pipe system.

* * * * *